United States Patent
Karttunen et al.

(10) Patent No.: US 7,010,476 B2
(45) Date of Patent: Mar. 7, 2006

(54) METHOD AND APPARATUS FOR CONSTRUCTING FINITE-STATE NETWORKS MODELING NON-CONCATENATIVE PROCESSES

(75) Inventors: Lauri J Karttunen, Redwood City, CA (US); Kenneth R Beesley, Meylan (FR)

(73) Assignee: Xerox Corporation, Stamford, CT (US)

( * ) Notice: Subject to any disclaimer, the term of this patent is extended or adjusted under 35 U.S.C. 154(b) by 1220 days.

(21) Appl. No.: 09/737,942

(22) Filed: Dec. 18, 2000

(65) Prior Publication Data

US 2002/0091512 A1    Jul. 11, 2002

(51) Int. Cl.
G06F 17/20    (2006.01)
G06F 17/27    (2006.01)

(52) U.S. Cl. .............................................. 704/1; 704/9

(58) Field of Classification Search .................... 704/9, 704/257

See application file for complete search history.

(56) References Cited

U.S. PATENT DOCUMENTS

| | | | | |
|---|---|---|---|---|
| 5,594,641 A | | 1/1997 | Kaplan et al. | 395/601 |
| 5,625,554 A | | 4/1997 | Cutting et al. | 364/611 |
| 5,642,522 A | | 6/1997 | Zaenen | 395/794 |
| 6,023,760 A | * | 2/2000 | Karttunen | 712/200 |
| 6,032,111 A | * | 2/2000 | Mohri | 704/9 |
| 6,278,973 B1 | * | 8/2001 | Chung et al. | 704/257 |

FOREIGN PATENT DOCUMENTS

WO    WO 9901828 A1 *  1/1999

OTHER PUBLICATIONS

Roche, Emmanuel. "Factorization of Finite-State Transducers", Mitsubishi Electric Research Laboratories, 1995.*
Kempe, Andre. Karttunen, Lauri. "Parallel Replacement in Finite State Calculus", Proceedings of the 16th International conference on Computational Linguistics, Coling 96, Copenhagen Denmark.*
Karttunen, Lauri. "The Replace Operator", Proceedings of the 33rd annual meeting on Association for Computational Linguistics table of contents, Cambridge, Massachusetts, pp.: 16-23, 1995 □□.*
Beesley, K. Karttunen, L. "Finite-State Non-Concatenative Morphotactics" Proceedings of the 38th annual meeting of association for Computation Linguistics, 2000, pp. 191-198.*
Karttunen, L. "Directed Replacement" Proceedings of the 34th annual meeting on association for computation linguistics, 1996, pp. 108-115.*
Bouma, G. "A Finite State and Data-Oriented Method for Grapheme to Phoneme Conversion" ACM International Conference Proceedings Series, vol. 4, pp. 303-310, 2000.*
Reape, M. Thompson, H. "Parallel Intersection and Serial Composition of Finite State Transducers" International Conference on Computational Linguistics, pp. 535-539, 1988.*

(Continued)

Primary Examiner—W. R. Young
Assistant Examiner—Matthew J Sked
(74) Attorney, Agent, or Firm—Oliff & Berridge, PLC (57) ABSTRACT

A system constructs finite-state networks. The system initially compiles an intermediate finite-state network from a source file of regular expressions. The intermediate finite-state network includes a delimited subpath that defines a substring having the form of a regular expression. The system subsequently produces an output finite-state network in which the delimited subpath is replaced with an FSN compiled from the substring encoded by the delimited subpath.

20 Claims, 9 Drawing Sheets

OTHER PUBLICATIONS

Lauri Karttunen, Ronald M. Kaplan, and Annie Zaenen. "Two-level morphology with composition", In COLING'92, pp. 141-148, Nantes, France, Aug. 23-28. 1992.

Lauri Karttunen. "Finite-state lexicon complier". Technical Report ISTL-NLTT-1993-04-02, Xerox Palo Alto Research Center, Palo Alto, CA, Apr., 1993.

Lauri Karttunen. "Constructing lexical transducers". In COLING'94, Kyoto, Japan. 1994.

Lauri Karttunen, Jean Pierre Chanod, Greg Grefenstette, and Anne Schiller. "Regular expressions for language engineering". Natural Language Engineering 2 (4), 305-328. 1996.

Lauri Karttunen, Tamás Gaál, and André Kempe 1997. "Xerox Finite-State Tool". Techical Report. Xerox Research Centre Europe, Grenoble. Meylan, France. Jun. 1997.

Laura Kataja and Kimmo Koskenniemi. "Finite-state descripton of Semitic morphology: A case study of Ancient Akkadian". In COLING'88, pp. 313-315. 1988.

Martin Kay. "Nonconcatenative finite-state morphology". In Proceedings of the Third Conference of the European Chapter of the Association for Computational Linguistics, pp. 2-10. 1987.

George Anton Kiraz and Edmund Grimley-Evans. "Multi-tape automata for speech and language systems: A Prolog implementation". In Jean-Marc Champarnaud, Denis Maurel, and Djelloul Ziadi, editors, Automata Implementation; vol. 1660 of Lecture Notes in Computer Science. Springer Verlag, Berlin, Germany. 1999.

George Anton Kiraz. "Multi-tape two-level morphology: a case study in Semitic non-linear morphology". In COLING'94, vol. 1, pp. 180-186. 1994.

George Anton Kiraz. "Semhe: A generalised two-level system". In Proceedings of the 34th Annual Meeting of the Association of Computational Linguistics, Santa Cruz, CA. 1996.

George Anton Kiraz. "Multi-tiered non-liner morphology: A case study on Syriac and Aribic". Computational Linguistics, vol. 26, No. 1. 2000.

Kimmo Koskenniemi. "Two-level morphology: A general computational model for word-form recognition and production". Publication 11, University of Helsinki, Department of General Linguistics, Helsinki. 1983. (See in particular pp. 27-28.).

Alon Lavie, Alon Itai, Uzzi Ornan, and Mori Rimon. "On the applicability of two level morphology to the infection of Hebrew verbs". In Proceedings of ALLC III, pp. 246-260. 1988. (See in particular bottom of p. 248.).

John J. McCarthy and Alan Prince. "Faithfulness and reduplicative identity". Occasional papers in Linguistics 18, University of Massachusetts, Amherst, MA. ROA-60. 1995.

John J. McCarthy. "A prosodic theory of nonconcatenative morphology". Linguistic Inquiry, 12(3):373-418. 1981.

Richard Sproat. "Morphology and Computation.". Section 2.4.4 Nonconcative morphology, MIT Press, Cambridge, MA. pp. 159-170. 1992.

Evan L. Antworth. "PC-KIMMO: a two-level processor for morphological analysis". Section 6.4 "Nonconcatenative processes" to section 6.4.7 "Reduptication with coalescence", in No. 16 of Occasional publications in academic computing. Summer Institute of Linguistics, Dallas. pp. 151-161. 1990, no date.

Kenneth R. Beesley, Tim Buckwalter, and Stuart N. Newton. "Two-level finite-state analysis of Arabic morphology". In Proceedings of the Seminar on Bilingual Computing in Arabic and English, Cambridge, England, Sep. 6-7. No pagination. 1989, no date.

Kenneth R. Beesley. "Finite-state description of Arabic morphology". In Proceedings of the Second Cambridge Conference on Bilingual Computing in Arabic and English, Sep. 5-7. No pagination. 1990, no date.

Kenneth R. Beesley. "Computer analysis of Arabic morphology: A two-level approach with detours". In Bernard Comrie and Mushira Eid, editors, Perspectives on Arabic Linguistics III: Papers from the Third Annual Symposium on Arabic Linguistics, pp. 155-172. John Benjamins, Amsterdam. 1991, year only.

Kenneth R. Beesley. "Arabic finite-state morphological analysis and generation". In COLING'96, vol. 1, pp. 89-94, Copenhagen, Aug. 5-9. Center for Sprogteknologi. The 16th International Conference on Computational Linguistics. 1996, year only.

Kenneth R. Beesley. "Arabic morphological analysis on the Internet". In ICEMCO-98, Cambridge, Apr. 17-18. Centre for Middle Eastern Studies. Proceedings of the 6th International Conference and Exhibition on Multi-lingual Computing. Paper No. 3.1.1; no pagination. 1998, year only.

Kenneth R. Beesley. "Arabic morphology using only finite-state operations". In Michael Rosner, editor, Computational Approaches to Semitic Languages: Proceedings of the Work-shop, pp. 50-57, Montréal, Québec, Aug. 16. Université de Montréal. 1998, year only.

Kenneth R. Beesley. "Arabic stem morphotactics via finite-state intersection". Paper presented at the 12th Symposium on Arabic Linguistics, Arabic Linguistic Society, Mar. 6-7, 1998, Champaign, IL.

Kenneth R. Beesley. "Consonant Spreading in Arabic Stems", In COLING-ACL'98, vol. 1, pp. 117-123. Aug. 1998, no date.

Kenneth R. Beesley and Lauri Karttunen. "Finite-State Non-Concatenative Morphotactics". SIGPHON-2000, Proceedings of the Fifth Workshop of the ACL Special Interest Group in Computational Phonology, pp. 1-12, Aug. 6, 2000, Luxembourg.

* cited by examiner

```
   ┌ String 1 (Upper-Side) 1 : try
60 ┤
   └ String 1 (Lower-Side) : try

┌ String 2 (Upper-Side) : tryd
62 ┤
   └ String 2 (Lower-Side) : tried

┌ String 3 (Upper-Side) : trys
64 ┤
   └ String 3 (Lower-Side) : tries
```

Extracted Finite State Network

FIG. 9A

First Temporary Finite State Network

FIG. 9B

Delimited Substring

FIG. 10A

Second Temporary Finite State Network

METHOD AND APPARATUS FOR CONSTRUCTING FINITE-STATE NETWORKS MODELING NON-CONCATENATIVE PROCESSES

BACKGROUND OF THE INVENTION

1. Field of the Invention

The present invention relates generally to finite-state language processing, and more particularly, to a method and apparatus for constructing finite-state networks. In one of many applications, this method and apparatus have proved useful in modeling natural languages that have non-concatenative processes.

2. Description of Related Art

Many basic steps in language processing, ranging from tokenization to phonological and morphological analysis, disambiguation, spelling correction, and shallow parsing can be performed efficiently by means of finite-state transducers. Such transducers are generally compiled from regular expressions. Regular expressions are a formal language (i.e., metalanguage) that can be used to model a natural language (e.g., French, English, etc.) or a relation. Although regular expressions and methods for compiling them into finite-state automata have been part of elementary computer science for decades, the application of finite-state transducers to natural language processing has given rise to many extensions to the classical regular expression calculus.

The term "formal language" or simply "language" is used herein to refer to sets of strings of any kind. The terms "string" and "word" are used interchangeably herein. A string is a concatenation of zero or more symbols. In the examples set forth below, the symbols are, in general, single alphabetic characters such as "a", but user-defined multi-character symbols such as "+Noun" are also possible. Multicharacter symbols are considered as atomic entities rather than as concatenations of single character strings. A string that contains no symbols at all is called the empty string and the language that contains the empty string but no other strings is known as the empty string language. A language that contains no strings at all, not even the empty string, is called the empty language or null language. The language that contains every possible string of any length is called the universal language.

The term "relation" is used herein to describe a set of ordered string pairs such as {<"a", "bb">, <"cd", " ">}. The first member of a pair is called the upper string, and the second member is called the lower string. A string-to-string relation is a mapping between two languages: the upper language and the lower language. They correspond to what is usually called the domain and the range of a relation. In this example, the upper language is {"a", "cd"} and the lower language is {"bb", " "}. A relation such as {<"a", "a">} in which every pair contains the same string twice is called an identity relation. If a relation pairs every string with a string that has the same length, the relation is an equal length relation. Every identity relation is obviously an equal length relation.

Regular expressions that denote a language compile into a "simple finite-state automaton", whereas regular expressions that denote a relation compile into a "finite-state transducer". The term "finite-state network" (FSN) or "network" as used herein covers both simple finite-state automata and finite-state transducers. A simple finite-state automaton, for example, is an FSN that can be used for recognizing word forms. In contrast, a finite-state transducer is an FSN that can be used for the generation or analysis of word forms. Simple finite-state automata and transducers will not be treated as different types of mathematical objects herein and will be described generally as finite-state networks (FSNs).

More specifically, an FSN is a directed graph that consists of states and labeled arcs. A directed graph is a computer data structure that can be used for computation in fields such as computational linguistics. An FSN contains a single initial state, also called the start state, any number of final states, and any number of labeled arcs leading from state to state. In the figures presented herewith, states are represented as circles and arcs (i.e., transitions) are represented as arrows. Each state acts as the origin for zero or more arcs leading to some destination state. A sequence of arcs leading from the initial state to a final state is called a "path". A sequence of arcs leading from one state to any other state is a "subpath". The set of subpaths of a given path includes the path. In a simple finite-state automaton, each path represents a string (e.g., a word) and each subpath represents a substring. In a transducer, each path represents an ordered pair of strings (e.g., words) and each subpath represents an ordered pair of substrings.

An FSN that encodes a simple finite-state automaton encodes transitions such that each transition has associated values on a single level, whereas an FSN that encodes a finite-state transducer encodes transitions such that each transition has associated values on more than one level. As a result, an FSN that encodes a finite-state transducer can respond to an input signal indicating a value on one of the levels by following a transition with a matching value on the level and by providing as output the transition's associated value at another level. A two-level transducer, for example, can be used to map between input and output strings.

At Xerox Corporation, a Xerox regular expression language that follows certain conventions has been defined for describing languages and relations. These conventions have been adopted herein to describe and illustrate the present invention. A feature of the Xerox convention is that simple automata and transducers that encode an identity relation are represented by the same FSN (i.e., the encoding of a single symbol is interpreted as a single symbol if a simple automaton and as an identity symbol pair if a transducer). In following Xerox convention, an arc of an FSN may be labeled either by a single symbol such as "a" or a symbol pair such as "a:b", where "a" designates the symbol on the upper side of the arc and "b" the symbol on the lower side. If all the arcs of an FSN are labeled by a single symbol (e.g., "a"), the FSN is defined by the Xerox convention as a simple automaton. However, if at least one label of an arc in an FSN is a symbol pair, the FSN is defined by the Xerox convention as a transducer.

Also by Xerox convention, in the diagrams presented herein the start state of an FSN is always the leftmost state and final states are marked by a double circle. Further background relating to the use of finite-state networks in natural language processing at Xerox Corporation is disclosed in "Syntax and Semantics of Regular Expressions"; "Finite-State Networks"; "Application of Finite-State Networks"; and "Examples of Networks and Regular Expressions", which are published on the Internet at http://www.xrce.xerox.com/research/mltt/fst/, and which are each incorporated herein by reference.

Unlike an FSN that is a simple finite-state automaton, an FSN that is a finite-state transducer is inherently bidirectional. Either side of a transducer can be used as the input side, with the other side being the output side. For example, a finite-state transducer can be used in mapping between different forms of words, such as between the surface forms (e.g., "try", "tries", "tried") that occur in ordinary usage of a language and their related citation forms (e.g., "try"). It is conventional to augment a surface form's related citation form with other information about the surface form ("try+Inf", "try+PresSg3", "try+Past") such that these forms can be read as analyses.

By arbitrary Xerox convention to be followed herein, surface forms (e.g., "try", "tries", "tried") are encoded by the lower or surface side of a finite-state transducer; citation or analysis forms (e.g., "try+Inf", "try+PresSg3", "try+Past") are encoded by the upper or lexical side of a finite-state transducer. A typical Xerox finite-state transducer therefore encodes a relation between a language of analysis strings, on the upper side, and a language of surface strings on the lower side.

It has long been known that an FSN can encode the mathematical entities referred to as languages and relations. An FSN is conventionally produced by an operation, referred to as "compilation". The compiler takes as input a description of the language or relation to be encoded. Simple languages and relations are commonly described using a metalanguage called regular expressions. A "regular expression" belongs to a formal language in which some of its elements are operands while others refer to operations that are performed on the operands. For more background on regular expressions refer to a publication by Hopcroft and Ullman entitled "Introduction to Automata, Theory, Languages, and Computation", Addison-Wesley, Reading Mass., 1979, and to a publication edited by J. Leeuwen, entitled "Handbook of Theoretical Computer Science, Volume B: Formal Models and Semantics," Elsevier Science Publishers B. V. 1990. (Note that the term "rational expression" as used by Leeuwen is synonymous with the term regular expression as used herein.)

To "compile" a regular expression is to perform an operation that begins with the text of the regular expression and that produces an FSN that encodes the language or relation denoted by the regular expression. The FSN is a "compiled version" of the regular expression. A compiler that takes as input regular expressions and compiles an FSN is defined herein as a "regular expression compiler". Other source notations (e.g., the Xerox language called lexc) are not technically regular expressions but have the same formal descriptive power and also compile into FSNs. Thus, regular expressions as referred to herein include other formalisms like lexc. Similarly, when regular expression compilers are referred to herein they include lexc compilers and any other compiler that compiles languages with the formal descriptive power of regular expressions.

A simple example of a regular expression using the Xerox regular-expression formalism is: [t r y ], which denotes the single-word language {"try"} and is formed by an operation that concatenates the symbols t, r, and y. An FSN that encodes this language can thus be obtained from the regular expression by compilation. Another example of a regular expression is: [[t|d ]r y], which denotes the language consisting of the two words {"try", "dry"} and specifies that the language is formed by an operation that obtains the union of t and d, [t|d ], and then concatenates it with [r y ]. The union operation can thus be represented in regular expressions by the union operator "|".

The structure of words in a natural language like English, referred to as "morphotactics", may often be described exhaustively in terms of concatenation and union. Most natural languages construct words by concatenating morphemes together one after another in strict orders. A word constructed in this way can typically be analyzed as a basic stem, possibly preceded by one or more prefixes and followed by one or more suffixes. The English word "nonconfrontationally", for example, can be analyzed as the stem "confront" preceded by the prefix "non" and followed by the suffixes "ation", "al", and "ly". Prefixes, stems and suffixes are morphemes. A morpheme is the minimal meaning-bearing component of a word.

Morphological alternations such as the y/ie alternation seen in the various forms of the word "try" above are also conventionally represented using the Xerox regular-expression formalism by regular expressions containing the replace operator "—>", which represents a replace operation, the context separator "||", and the indicator "_", which indicates the site of the replacement between two contexts. For example, the regular expression:

y—>ie||Cons_[s|d].#.

denotes a relation between pairs of strings that are the same except that instances of "y" in strings of the upper-side are replaced by instances of "ie" in the related strings of the lower side, but only if "y" occurs after a consonant and before "s" or "d" at the end of the word. An FSN obtained by compiling this regular expression can be applied to forms such as "trys" and "tryd" to produce the correct inflected forms "tries" and "tried".

The application of an FSN to a language in this manner is referred to as "composition", conventionally represented in regular expressions of the type described herein by the composition operator ".o.". For example, the relation between the hypothetical forms {"try", "trys", "tryd"} and the corresponding correct forms {"try", "tries", "tried"} can be denoted by the regular expression:

[try[0|s|d]].o.y—>ie||Cons_[s|d].#.

with the number "0" representing the empty string, also referred to as epsilon.

Figure 1:
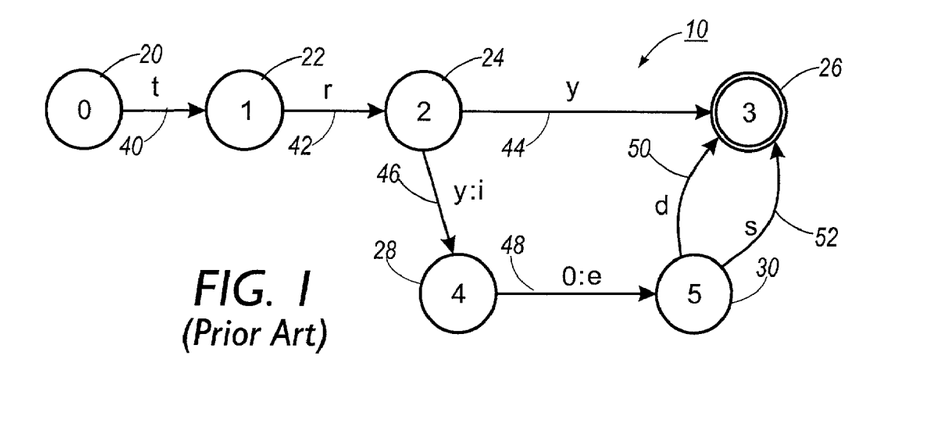
FIG. 1 illustrates a state-transition diagram conventionally representing an FSN compiled from a regular expression.

Known regular expression compilers can produce an FSN from such a regular expression. Such compilers must appropriately interpret regular expression operators which include: concatenation, union, replacement, and composition. FIG. 1 illustrates one conventional way to represent the resulting FSN in the form of a graph 10, with circles 20, 22, 24, 26, 28, and 30 representing states of the FSN and with arrows 40, 42, 44, 46, 48, 50, and 52 representing transitions from state to state.

In graph 10, each circle contains a number that identifies the state it represents, and each transition has a label that represents a constraint on the transition. Here finite-state networks are arbitrarily represented as Mealy machines, with labeled transitions, rather than as Moore machines, in which the labels are stored on states; because the two representations are equivalent and interchangeable, nothing substantial hinges on this choice. Circle 20, numbered 0, represents the start state of the FSN, while circle 26 is doubled to indicate a final state that can terminate an acceptable sequence of states and transitions. In graph 10 in FIG. 1, the labels represent constraints that include pairs of symbols, only one of which is shown if both are the same, as with transitions 40, 42, 44, 50, and 52.

Figure 2:
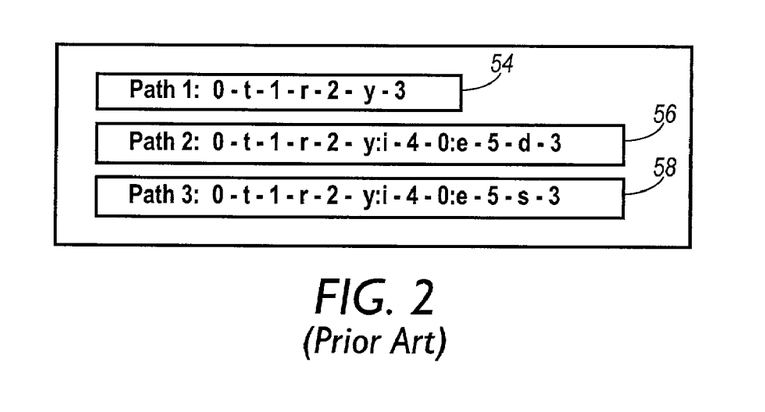
FIG. 2 illustrates three paths of the FSN shown in FIG. 1.
Figure 3:
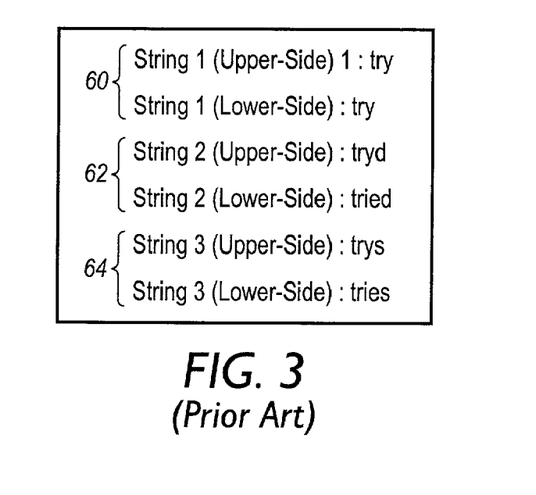
FIG. 3 illustrates the upper and lower strings related by each path shown in FIG. 2 of the FSN shown in FIG. 1.

Every path of a finite-state transducer represents a string or an ordered pair of strings. Each path 54, 56, and 58 shown in FIG. 2 therefore represents a pair of strings 60, 62, and 64, respectively, as shown in FIG. 3. For example, path 58 represents the pair of strings 64 "trys" and "tries". In accordance with Xerox conventional techniques, an FSN represented by graph 10 can be applied "in a downward direction" to an input string while treating the upper-side symbol in each pair as a symbol that must be matched by an input symbol to make the transition and the lower-side symbol in each pair as an output symbol that is provided whenever the transition is made. Conversely, the same network can be applied "in an upward direction", with the lower-side symbols matching input and the upper-side symbols being output. (It will be appreciated by those skilled in the art that many alternate paths and strings exist for the FSN 10 besides those shown in FIGS. 2 and 3.)

In addition to the industry standard concept of path through an FSN, which extends from the start state to a final state and encodes a string or ordered pair of strings, the notion of "subpath" is added herein. A subpath in an FSN extends from one state, not necessarily a start state, to another state, not necessarily a final state, via a sequence of arc transitions. Thus, FSN 10 in FIG. 1 also includes the subpaths 0-t-1-r-2, 0-t-1, 1-r-2-y-3, etc. The set of subpaths include the set of paths (i.e., 0-t-1-r-2-y-3 is both a path and a subpath), but not all subpaths are paths. Similarly, a subpath encodes a substring or pair of substrings. All strings are substrings but not all substrings are strings.

A "delimited subpath" refers to herein a subpath that encodes a substring, wherein the first symbol of the substring is preceded in an FSN by a predefined starting delimiter, and the last symbol is followed by a predefined ending delimiter. In one embodiment, the predefined starting delimiter and the predefined ending delimiter are arbitrarily selected as "ˆ[" and "ˆ]", respectively. A "delimited substring" is a string of symbols on a subpath bounded by the predefined starting delimiter and the predefined ending delimiter. When the FSN is a transducer, a subpath may be a delimited subpath on the upper side, the lower side, or simultaneously on both sides.

Although most natural languages construct words by concatenating morphemes together one after another in strict orders, many natural languages exhibit morphotactic processes that cannot be straightforwardly modeled by concatenation. Such processes are called "nonconcatenative morphotactics processes" or simply "nonconcatenative processes". In Arabic, for example, stems are formed by a process known as "interdigitation", while in Malay, plurals are formed by a process known as "full stem reduplication". Although both Arabic and Malay also include prefixation and suffixation that can be modeled by concatenation in the usual way, a complete lexicon cannot be obtained without nonconcatenative processes.

More specifically, interdigitation and other processes that result in discontinuous morphemes cannot be modeled solely by concatenation of constituent morphemes. An example of interdigitation occurs with the Arabic stem "katab", which means "wrote". As analyzed by McCarthy, J. J., "A prosodic theory of nonconcatenative morphology", Linguistic Inquiry, Vol. 12, No. 3, 1981, pp. 373–418, this stem consists of an all-consonant root "ktb" whose general meaning has to do with writing, an abstract consonant-vowel template CVCVC, and a voweling or vocalization symbolized simply as "a", signifying perfect aspect and active voice. The root consonants are associated with the C slots of the template and the vowel or vowels with the V slots, producing a complete stem "katab". If the root and the vocalization are thought of as morphemes, neither morpheme occurs continuously in the stem. The same root "ktb" can combine with the template CVCVC and a different vocalization "ui", signifying perfect aspect and passive voice, producing the stem "kutib", which means "was written". Similarly, the root "ktb" can combine with CVVCVC and "ui" to produce "kuutib", the root "drs" can combine with CVCVC and "ui" to form "duris", and so forth.

Like interdigitation, full reduplication of this type cannot be modeled solely by concatenation of sublexicons. An example of full stem reduplication occurs with the Malay stem "bagi", which means "bag" or "suitcase". Its plural is "bagibagi", formed by repeating the stem twice in a row. Although this pluralization process may appear concatenative, it does not involve concatenating a predictable pluralizing morpheme, but rather copying the preceding stem, whatever it may be and however long it may be.

SUMMARY OF THE INVENTION

In accordance with the invention, the problems of modeling nonconcatenative morphotactic processes with techniques involving finite-state networks are alleviated. The invention is implemented via a "compile-replace" routine that takes as input an intermediate FSN (finite-state network). The compile-replace routine searches a designated side of the intermediate FSN to identify delimited subpaths. Each delimited subpath in the intermediate FSN is a subpath that encodes a "delimited substring" in the format of a regular expression. The compile-replace routine then replaces each delimited subpath in the intermediate FSN with a finite-state network that is compiled from the delimited regular-expression substring. Advantageously, the invention facilitates the building, in multiple steps, of complex finite-state networks that would be difficult to define in one step using a single regular expression.

In accordance with one aspect of the invention, there is provided a method, and apparatus therefor, for producing finite-state networks. Initially, an input (or intermediate) FSN is produced that has a set of paths, with at least one of the paths in the set of paths containing a delimited subpath. On an indicated side of the input FSN, the delimited subpath represents a delimited substring that has the format of a regular expression. A first temporary finite-state network is created by extracting the delimited subpath from the input FSN, and eliminating the symbols on the indicated side of the delimited subpath. A second temporary finite-state network is created by compiling the delimited substring as a regular expression. The cross-product of the first temporary finite-state network and the second temporary finite-state network is computed to define a resulting finite-state network. An output finite-state network is produced by replacing the delimited subpath in the input finite-state network with the resulting finite-state network.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 4:
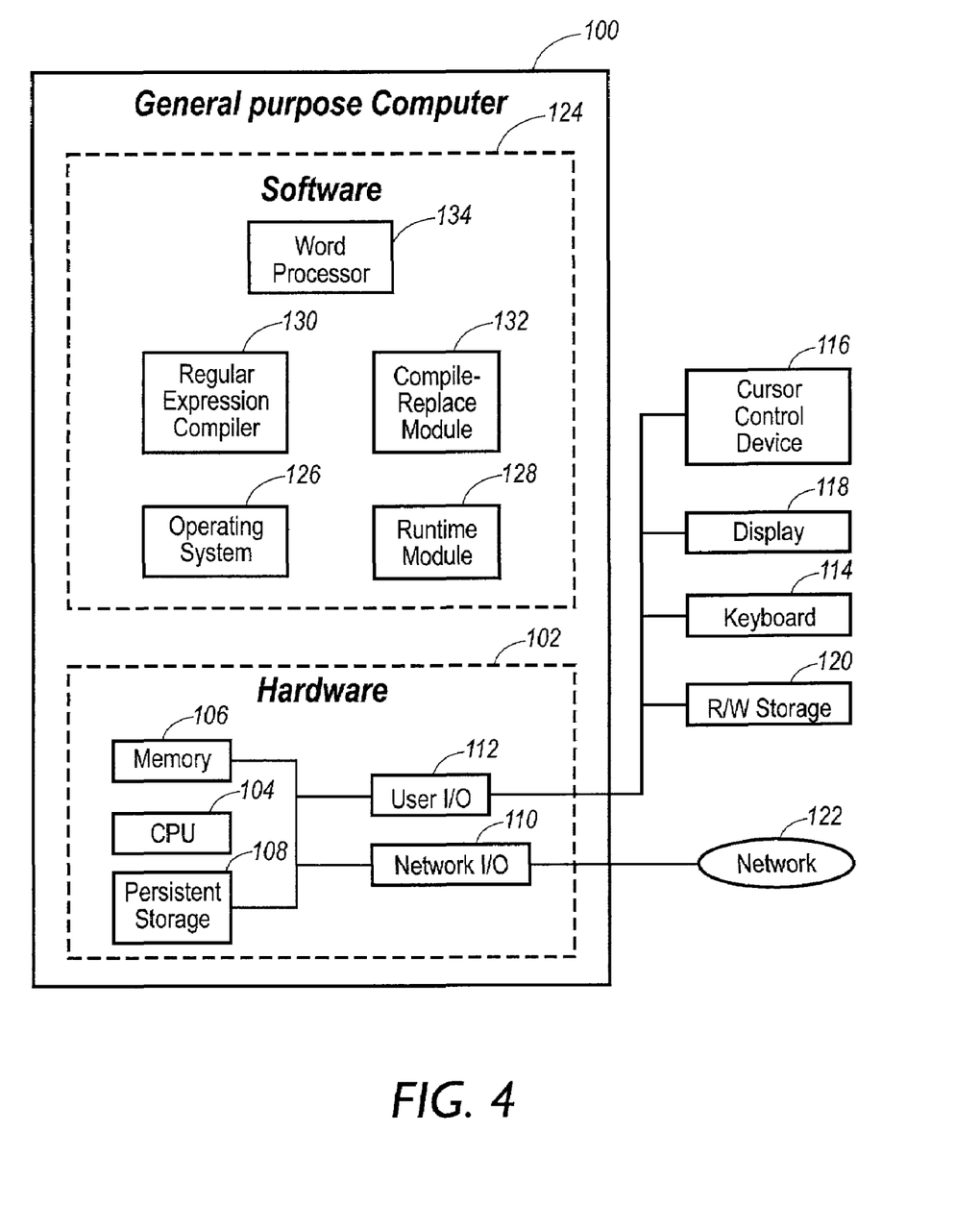
FIG. 4 illustrates a general purpose computer on which finite-state programs are constructed and executed in accordance with the present invention.

FIG. 4 illustrates a general purpose computer 100 on which finite-state programs are constructed and executed in accordance with the present invention. The general purpose computer 100, which may be any personal workstation or computer, includes hardware 102 and software 124. The hardware 102 includes a processing unit (i.e., CPU) 104 for running (i.e., executing instructions in) the software 124 stored in memory 106, persistent storage 108, or available over network input/output (I/O) 110 and/or user input/output 112. The user input/output 112 may be coupled to various input and output devices, such as a keyboard 114, a cursor control device 116 (e.g., pointing stick, mouse, etc.), a display 118, and read/write (R/W) storage (e.g., disk, tap, floppy, etc.) 120. The network input/output 110 may be coupled, directly or indirectly, to any network 122 such as an intranet or the Internet.

The software 124 available to operate on the computer 100 includes an operating system 126, a runtime module 128, a regular expression compiler 130, a compile/replace module 132, and a word processor 134. As set forth above, the regular expression compiler 130 may consist of a compiler for any language having the same descriptive power as regular expressions. The finite-state programs for carrying out different aspects of the present invention include the runtime module 128, the regular expression compiler 130, and the compile/replace module 132, each of which is discussed in more detail below. The operating system 126 and the word processor 134 may comprise any suitable program that is known in the art (e.g., unix and emacs, respectively).

The other software available to operate on computer 100 not shown in FIG. 4 may include: lexicon FSN producing routines, dictionary extraction routines, rule writing, compiling, and composing routines, and lexicon FSN application routines, some of which are described below. In addition, several items of data stored in memory 106 and accessed by CPU 104 during execution of software 124 may include: a dictionary database, lexicon source files, lexicon FSNs, rule files, and miscellaneous data items, some of which are described below.

Figure 5:
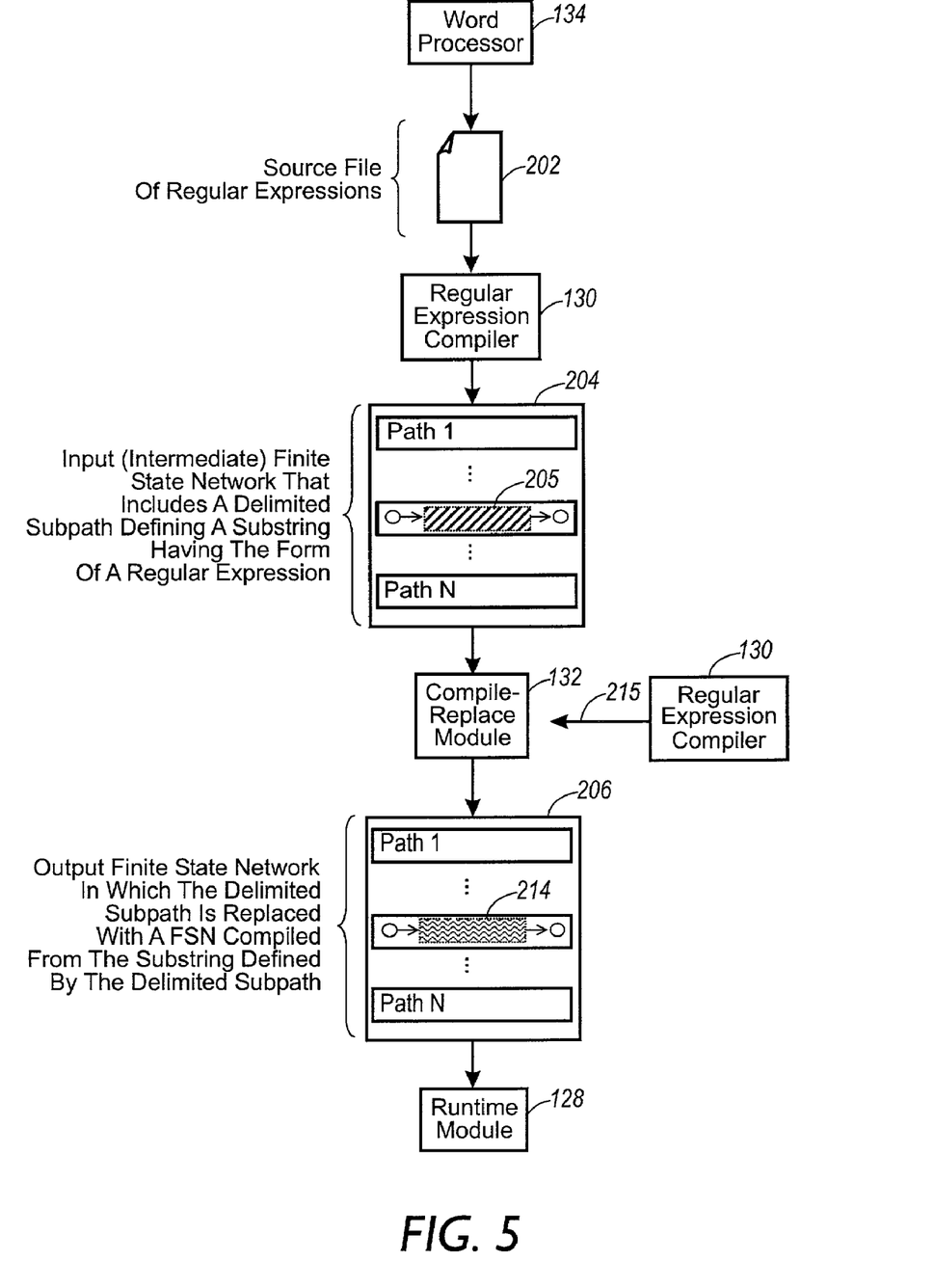
FIG. 5 is a data flow diagram that illustrates the development of finite-state networks with non-concatenative morphotactics using the software modules shown in FIG. 4.
Figure 6:
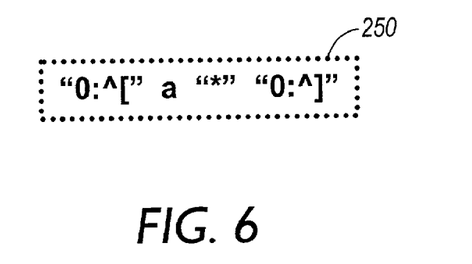
FIG. 6 illustrates an example of a source file containing a regular expression.

FIG. 5 is a data flow diagram that illustrates the development of finite-state networks with non-concatenative morphotactics using the software modules that are shown in FIG. 4. Initially, the word processor 134 or equivalent is used to generate a source file of regular expression(s) 202. FIG. 6 illustrates an example of contents 250 of the source file 202. It will be appreciated by those skilled in the art that the source file of regular expressions 202 may be produced using either automated, semi-automated, or manual processes and that the use of the word processor 134 is merely illustrative of one of these different techniques. It will also be appreciated by those skilled in the art that the source file of regular expressions may be represented using an alternative specification language that has the same descriptive power as regular expressions (e.g., Xerox's lexc or twolc language).

Figure 7:
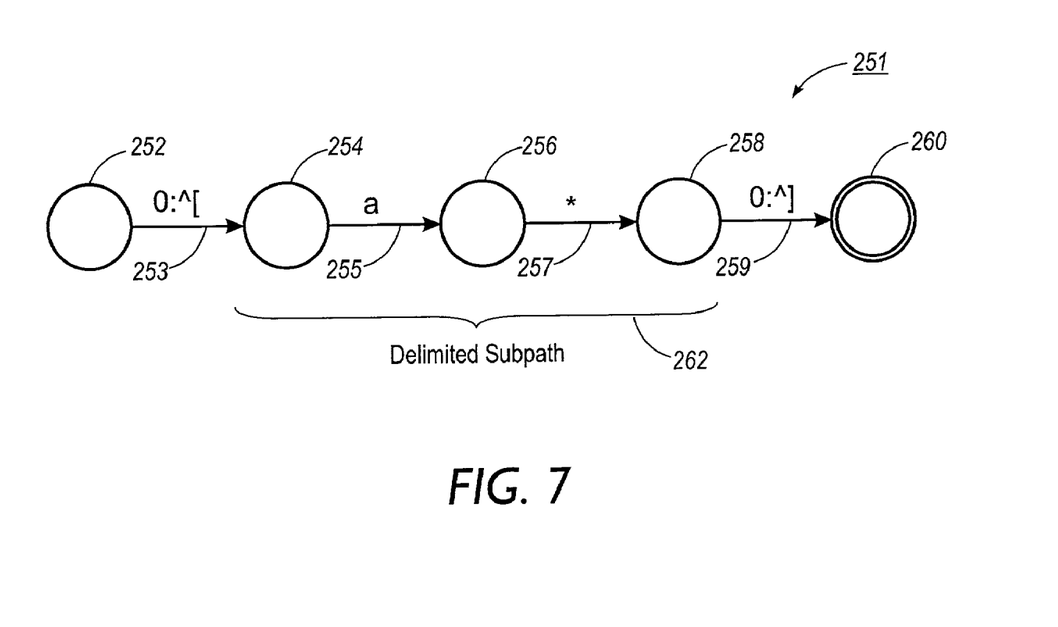
FIG. 7 illustrates an example of the FSN that is output by the regular expression compiler 130 when provided as input the regular expression shown in FIG. 6.

Subsequently, an input (or intermediate) FSN 204 is produced, in one embodiment, when the source file of regular expressions 202 is compiled by the regular expression compiler 130. Notwithstanding the manner in which the input FSN 204 is produced, one or more subpaths in the input FSN 204 may be delimited, such as subpath 205, using special delimiter symbols (e.g., "^[" and "^]"). In an alternate embodiment, these subpaths of the FSN 204, which are defined herein as "delimited subpaths", may be formed in complex ways, e.g. via operations like composition and substitution that introduce or reintroduce the designated delimiter symbol into a network. FIG. 7 illustrates an example of an FSN, with a delimited subpath 262, that is output by the regular expression compiler 130 when provided as input the regular expression 250 shown in FIG. 6. More specifically, the FSN shown in FIG. 7 contains a delimited subpath that encodes the delimited substring "a*" on the lower side. The substring between the delimiters, "a*", is a valid regular expression.

Figure 18:
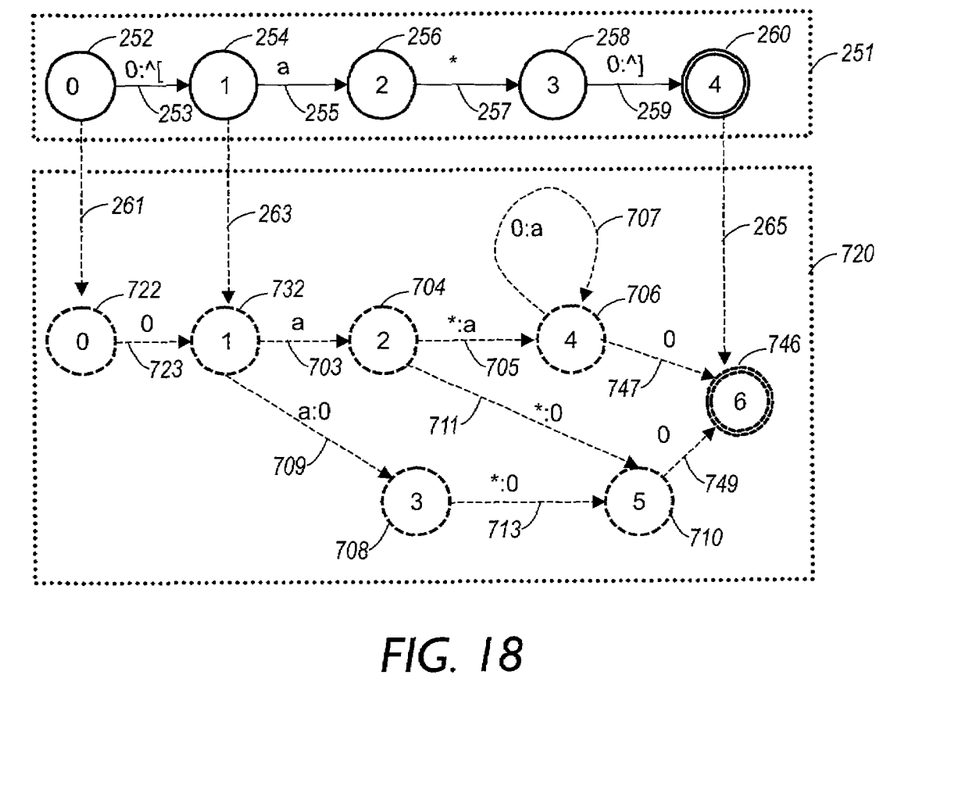

In accordance with the invention, each delimited subpath (e.g., delimited subpath 205) in the input FSN 204 is modified by the compile-replace module 132 to obtain an output FSN 206. In the output FSN 206, each delimited subpath is replaced by a resulting FSN (e.g., resulting FSN 214) that is produced using a compiled representation of itself, using the regular-expression compiler 130 as indicated by arrow 215, the details of which are discussed below. FIG. 18 illustrates an example of an FSN 720 that is output by the compile-replace module 132 when provided as input the FSN 251 (also shown in FIG. 7), in which the delimited substring 262 is replaced by the resulting FSN 701 shown in FIG. 11.

In practice, if the strings defined by the paths in the input FSN 204 represent words from a natural language with nonconcatenative processes, such as interdigitation or full stem reduplication, the delimited subpath 205 could define a section of the word that needs to be built using nonconcatenative processes. These processes may include intersection, iteration, or any other operations that can be expressed in a regular expression. Advantageously, delimited subpaths provides a mechanism for defining strings of an intermediate network so that they contain substrings that are in the format of regular expressions. The delimiter symbols "^[" and "^]" may be included in an original regular expression defining the intermediate FSN, or they may be (re)introduced into any FSN using operations such as composition or substitution. It will be appreciated by those skilled in the art that the output of the compile-replace module 132 can be applied to its own output multiple times. In effect, the compile-replace module 132 allows the regular-expression compiler to reapply to and modify its own output any number of times.

Once the final version of the output FSN 206 is output from the compile-replace module 132, the runtime module 128 can execute FSN application routines using the output FSN 206. For example, miscellaneous data items stored in the memory 106 can include strings on which the FSN application routines can operate by accessing the output FSN 206. Examples of conventional lexicon FSN application routines include a morphological analyzer that maps from the surface form to the lexical form and a morphological generator that maps from the lexical form to the surface form.

B. The Compile-Replace Routine

Figure 8:
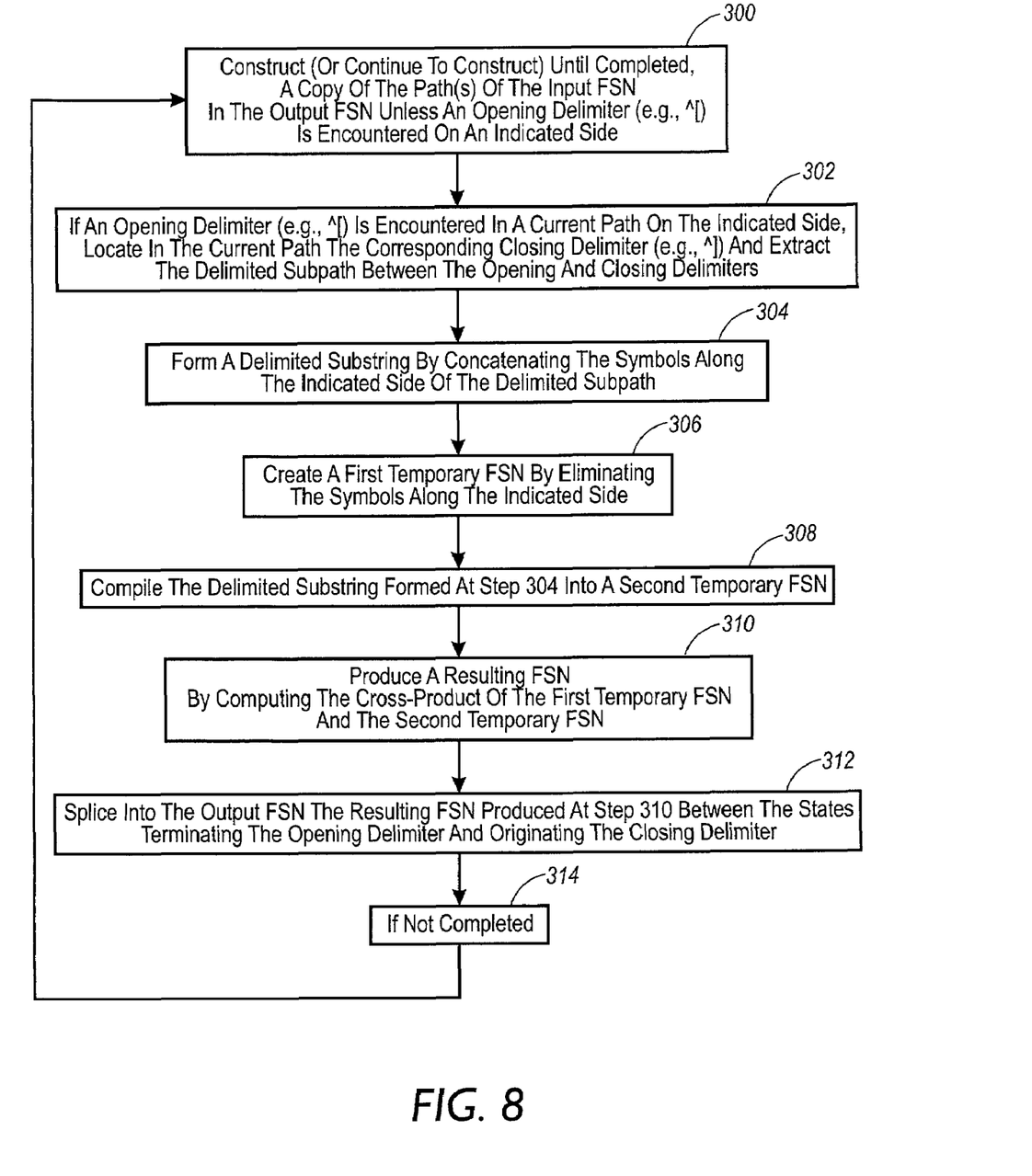
FIG. 8 is a flow diagram showing the steps performed by the compile-replace module 132 (or routine)

FIG. 8 is a flow diagram showing the steps performed by the compile-replace module 132 (or routine) shown in FIGS. 4 and 5. In general, paths of the input network 204 are defined so that they contain delimited subpaths encoding delimited substrings that are in the format of a regular expression, thereby allowing the compile-replace routine to reapply the regular expression compiler 130 to those delimited substrings. The steps shown in FIG. 8 are explained in detail below while referring to the example diagrams and networks shown in FIGS. 5, 6, 7, 9A, 9B, 10B, and 11.

Initially at step 300, a copy of the paths of the input (or intermediate) finite-state network 204 are copied into an output finite-state network 206 unless an opening delimiter that indicates the beginning of a delimited subpath is encountered on an indicated side of the input FSN 204. In the example FSN 251 shown in FIG. 7, the indicated side is the bottom (or surface form) side.

In one embodiment, the special characters "^[" and "^]" serve as delimiters for regular expression substrings. If X and Y stand for any languages or relations, the following are examples of simple delimited regular expressions and the conventional results of compiling them:

^[X Y ^] denotes the concatenation of X in front of Y;
^[X^n ^] denotes a concatenation of n instances of X;
^[X* ^] denotes the Kleene-star closure of X; and
^[X+^] denotes the Kleene-plus closure of X.

Figure 9A:
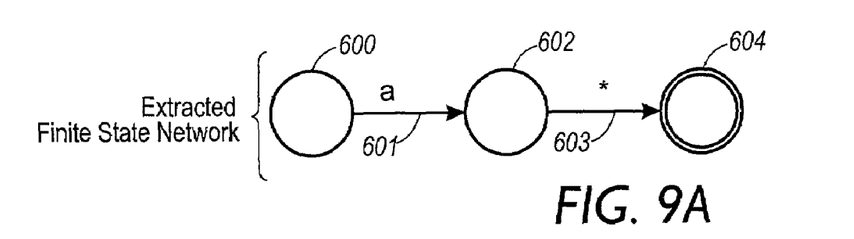
FIG. 9A illustrates an example of an extracted delimited subpath at step 302 in FIG. 8 for the FSN shown in FIG. 7.

At step 302, when an opening delimiter (e.g., ^[) is encountered at step 300 in a current path of the input finite-state network, its closing delimiter (e.g., ^]) is located and the delimited subpath between the opening and closing delimiter is extracted. For example, the FSN shown in FIG. 9A is extracted from the FSN shown in FIG. 7. At step 304, a string (i.e., the delimited substring) is formed by concatenating the symbols on the indicated side of the extracted subpath. Following Xerox convention, the FSN in FIG. 9A encodes both the language containing the string {"a*"} and the identity relation containing the ordered pair {<"a*", "a*">}. The extracted lower-side delimited substring is therefore "a*".

At step 306, a first temporary FSN is created by eliminating the symbols along the indicated side of the extracted subpath. In this particular example, given the Xerox encoding convention, eliminating the symbols on the lower side of the FSN in FIG. 9A is a null operation, leaving the FSN in FIG. 9B unchanged. The input FSN shown in FIG. 7 has states 252, 254, 256, 258, and 260, transitions 253, 255, 257, and 259, and the lower side as the selected side, and the first temporary network shown in FIG. 9B has states 600, 602, and 604 and transitions 601 and 603.

Figure 10A:
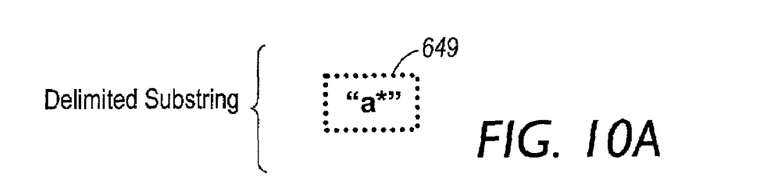
FIG. 10A illustrates an example of a regular expression substring formed at step 304 shown in FIG. 8 for the FSN shown in FIG. 7.

At step 308, the string formed at step 304 is compiled into a second temporary finite-state network using the regular expression compiler 130. For example, FIG. 10A illustrates the string "a*" formed at step 304 for the network shown in FIG. 7. When compiled as a regular expression at step 308, the string "a*" is represented by the FSN shown in FIG. 10B, having state 650 and transition 651.

At step 310, the first temporary finite-state network created at step 306 and the second temporary finite-state network compiled at step 308 are combined into a resulting finite-state network using the cross-product operation. For example, the cross-product of the example first temporary finite-state network shown in FIG. 9B and the example second temporary finite-state network shown in FIG. 10, is the FSN 701 illustrated in FIG. 11, which has states 702, 704, 706, 708, and 710 and transitions 703, 705, 707, 709, 711, and 713.

Figure 9B:
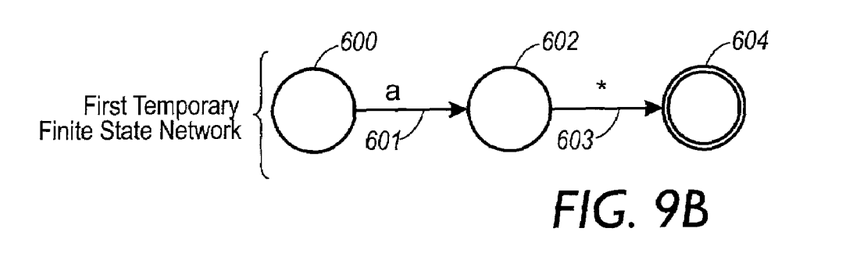
FIG. 9B illustrates an example of a first temporary FSN created at step 306 in FIG. 8 for the FSN shown in FIG. 7.

In the Xerox implementation, the cross-product operation produces a finite-state transducer from two simple finite-state automata. The first and second temporary networks encode languages (i.e., not relations). In the Xerox implementation, where a network like that in FIG. 9B is used to encode both the language containing {"a*"} and the relation {<"a*", "a*">}, it is automatically treated as encoding a language when it is used in a cross-product operation. In this embodiment, the resulting finite-state network produced by the cross-product operation relates the string encoded by the first temporary network with the strings encoded by the second temporary network.

At step 312, the resulting finite-state network produced at step 310 is spliced into the output finite-state network between the states representing the termination of the opening delimiter and the origin of the closing delimiter in the current path. For example, the resulting finite-state network 720, shown in FIG. 18, has spliced between states 732 and 746 the finite-state network 701 shown in FIG. 11. The FSN 720 is an example of the output finite-state network 206 shown in FIG. 5, which includes a compiled representation (i.e., network encoding) of the delimited regular expression in the input or intermediate FSN 251.

C. Detailed Implementation of the Compile-Replace Routine

The compile-replace operation could be implemented in various ways. A general approach that has been successfully implemented is to treat the compile-replace operation as a variant of a recursive-descent copy routine. Like a recursive-descent copy routine, the compile-replace routine can descend recursively into the data structure, avoiding loops by marking each state it encounters. Unlike the copy operation, however, the compile-replace operation has two modes, a copy mode and a regular expression mode.

Referring again to the flow diagram set forth in FIG. 8, at step 300, the compile-replace operation begins in the copy mode and continues until a start delimiter (e.g., ^[) is found indicating the beginning of a delimited subpath. When such a start delimiter is found, a shift is made into the regular expression mode. In the regular expression mode, steps 302, 304, 306, 308, 310, and 312 are performed, at which point a shift is made back to copy mode at step 300 if the routine has not completed at step 314.

Generally, the compile-replace operation modifies an FSN by splicing out the subpaths that encode regular-expression substrings and by replacing each such subpath by an FSN that encodes the language denoted by that regular expression.

As discussed above, FIG. 7 shows an example FSN that consists of a single path that encodes the regular expression "a*" enclosed between two delimiters (or markers), "^[" and "^]" that are used by the compile-replace operation to identify regular expression subpaths. The infinite language denoted by the regular expression "a*" is represented after compilation by the FSN shown in FIG. 10B. This FSN accepts any string that consists of zero or more "a"S.

The input to the function that implements the compile-replace routine consists of an FSN that may include delimited subpaths that encode substrings of symbols in the format of a regular expression. If the FSN does not contain any delimited subpaths, the result of the compile-replace operation is simply a copy of the original FSN.

In describing the compile-replace routine it is convenient to think of an FSN as containing a list of states with a designated start state. Each state in the list of states has: (1) a mark (i.e., a flag or a finality mark) indicating whether or not the state is final, (2) a pointer to a list of transitions (i.e., outgoing arcs) originating at the state (note that the list may be empty), and (3) a data field that may be used by the compile-replace operation to store, for example, a pointer to a copy of the state.

In addition by way of background, each transition in an FSN is represented in the compile-replace routine by an arc that contains: (1) an integer identifying a label (i.e., value) of the arc, (2) a pointer to a destination state, and (3) a next pointer to the next arc originating from the same state. A next pointer is NULL if the current arc is the last arc in the list. As shown in FIG. 7, the beginning and the end of the delimited subpath 262 is marked with specified delimiter symbols, "^[" and "^]".

The compile-replace routine operates in one of two modes depending on whether it is processing a delimited subpath or an ordinary subpath. The compile-replace routine traverses all the paths of the original network in a depth-first manner starting from the start state of the input or intermediate FSN to incrementally construct an output FSN.

Initially, the compile-replace routine begins, regardless of the mode, by defining the output FSN to contain a start state with an empty list of transitions. The start state of the new FSN inherits the finality mark of the start state of the input or intermediate FSN. A pointer to the start state of the new FSN is stored in the data field of the start state of the original FSN.

C.1 Copy Mode Of The Compile-Replace Routine

Figure 12:
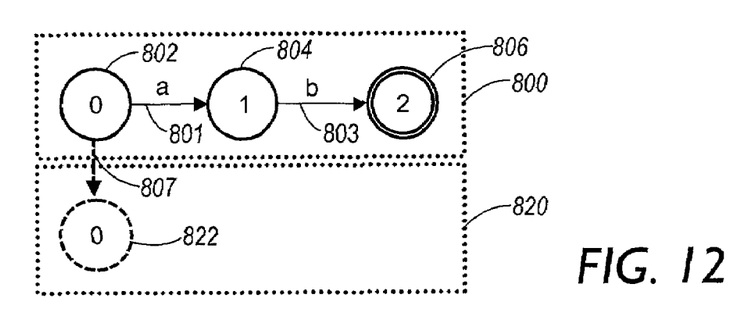
FIGS. 12, 13, and 14, illustrate an example of the copy mode of the compile-replace routine.
Figure 13:
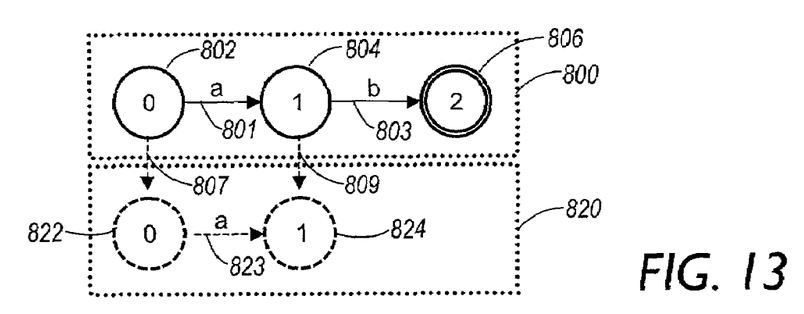
Figure 14:
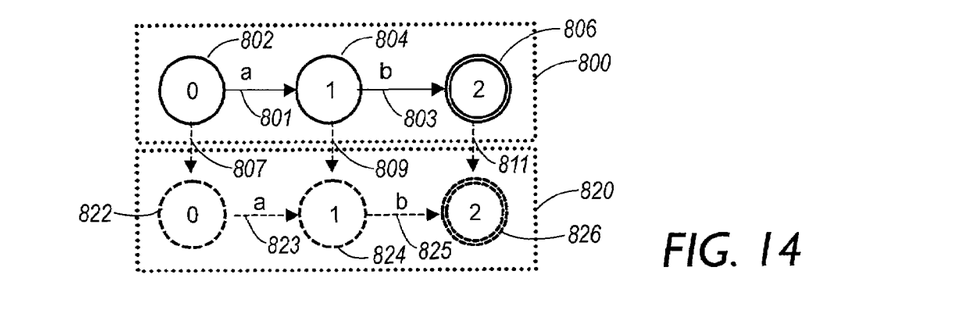

Reference is now made to FIGS. 12, 13, and 14, which illustrate an example of the copy mode of the compile-replace routine. More specifically, FIG. 12 illustrates an example in which an ordinary path 0-a-1-b-2 in the FSN 800 is copied to a new FSN 820. (Note that in the ordinary path 0-a-1-b-2 of the original FSN 800, states 802, 804, and 806 correspond to 0, 1, and 2, respectively.)

As set forth above, regardless of the mode of operation, a start state 822 is created in the new FSN 820, and the finality mark of the start state 822 inherits the finality mark of the start state 802 of the original FSN 800. The copy operation begins by loading a pointer 807 in the data field of the state 802 in the original FSN 800. The destination of the pointer 807 is the start state 822 in the new FSN 820.

The copy operation initializes the state stack with the state 802 and the arc stack with the arc 801 of the original FSN 800. Subsequently, the copy routine processes the first arc on the arc stack, arc 801 of the state 802 in the original FSN 800. The next-arc pointer of the arc 801 is pushed onto the arc stack for further processing; in this case, however, a NULL pointer is pushed to the arc stack because there is no next arc from state 802.

When evaluating an arc, the first task is to check the data field of the arc's 801 destination, state 804 of the original FSN 800. If a pointer to a copy of the state in the data field of state 804 is empty as shown in FIG. 12, then a new state 824 with the same finality is created in the new FSN 820 and a pointer 809 to the new state 824 is stored in the data field of the corresponding original state 804 as shown in FIG. 13.

Finally because the label of the arc 801 (i.e., "a") did not indicate a shift from the copy mode (i.e., no regular expression delimiter on the selected side of the arc's label), an arc 823 with the same label as the current arc 801 is pushed into the arc list of the state 822 that corresponds to the current state 802 of the original FSN 800. The destination of the new arc 823 is the state 824 corresponding to the destination of the original arc 801. The result is shown in FIG. 13.

At this point, the current arc's destination, state 804, is made the current state and is pushed onto the state stack. Similar to the processing of state 802, a new state 826 is created in new FSN 820. In addition, a new pointer 811 to the new state 826 is added in the data field of the state 806. Finally, an arc 825 with the same label as the arc 803 is pushed onto the arc list of the state 824. These results are shown in FIG. 14.

At this point, the current arc's destination, state 806, is made the current state and state 806 is pushed onto the state stack. Because there are no arcs in the state 806, the copy routine unwinds the state stack and arc stack to the next arc of the last state it processed, the arc 803 of state 804. Because there is no next arc for this state, the routine unwinds the state and arc stacks further to the next arc of the previously processed state, the arc 801 of state 802. As there is no next arc (i.e., only a NULL pointer), and no previously processed state, the routine terminates and the new FSN 820 shown in FIG. 14 is returned as the result.

C.2 Regular Expression Mode of the Compile-Replace Routine

Figure 15:
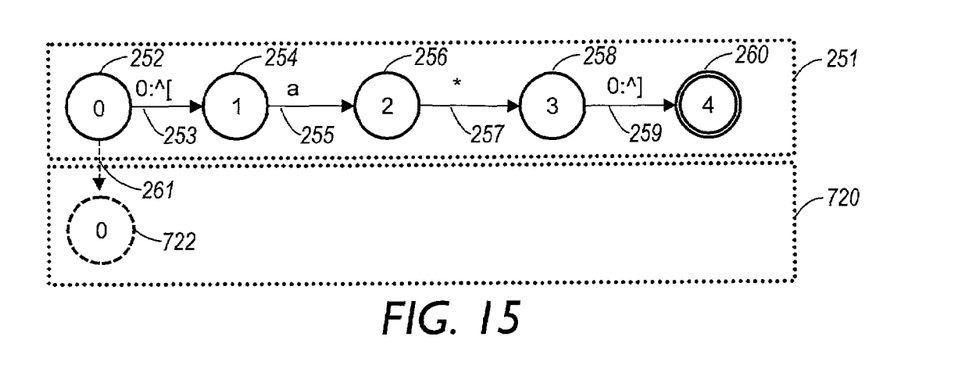
FIGS. 15, 16, 17, and 18, illustrate an example of the regular expression mode of the compile-replace routine.

Reference is now made to FIGS. 15, 16, 17, and 18, which illustrate an example of the regular expression mode of the compile-replace routine. Referring initially to FIG. 15, an example is described below in which the delimited subpath 0-0:^[-1-a-2-*-3-0:^]-4 of the original FSN 251 (also shown in FIG. 7) is processed by the compile-replace routine, where states 252, 254, 256, 258, and 260 correspond to 0, 1, 2, 3 and 4, respectively.

As set forth above and shown in FIG. 15, the compile-replace routine begins by defining a new FSN 720 to contain only a start state 722 with an empty list of transitions. The start state 722 of the new FSN 720 inherits the finality mark of the start state 252 of the original FSN 251. A pointer 261 to the start state 722 of the new FSN 720 is stored in the data field of the start state 252 of the original FSN 251.

Beginning in the copy mode, the compile-replace routine initializes the stack with the state 252 and the arc stack with the arc 253 of the original FSN 251. The routine processes the first arc on the arc stack, arc 253 of the state 252 in the original FSN 251. The next pointer of the state 252 is pushed onto the arc stack for further processing; in this case, however, a NULL pointer is pushed to the arc stack because there is no next arc from state 252.

Figure 16:
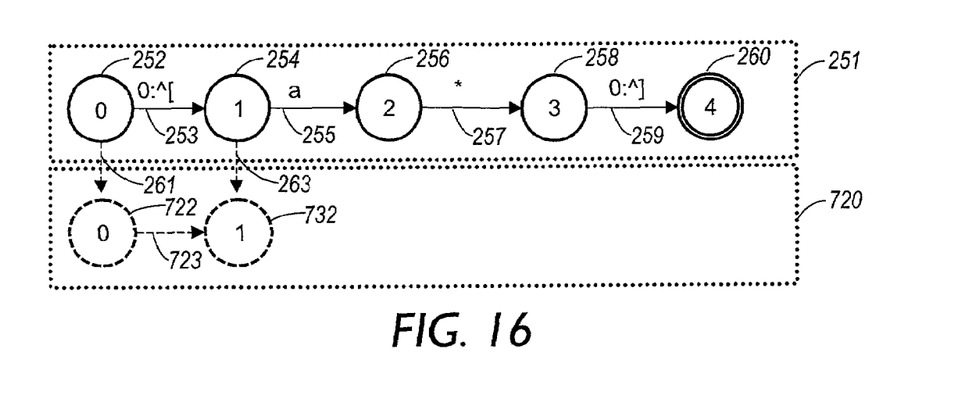

Subsequently, the data field of the arc's 253 destination, state 254 of the original FSN 800 is evaluated. If a pointer to a copy of the state in the data field of state 254 is empty as shown in FIG. 15, a new state 732 with the same finality is created in the new FSN 720 and a pointer 263 to the new state 732 is stored in the data field of the corresponding original state 254 as shown in FIG. 16.

Finally, the label of the arc 253 is examined on a selected side. In this example, the selected side is the lower side. Because a regular expression start delimiter (e.g., "^[") was encountered on the selected side of the arc 253 of the FSN 251, the compile-replace routine shifts from the copy mode to the regular expression mode. In addition, an arc 723 with a modified label is pushed into the arc list of the state 722 that corresponds to the current state 252 of the original FSN 251. The destination of the new arc 723 is the state 732 corresponding to the destination of the original arc 253. In creating the label of the arc 723 in the new FSN 720, the start delimiter label "^[" is replaced with the epsilon symbol, producing in this example a label consisting of an epsilon symbol on the upper and lower side, as shown in FIG. 16. (Note that in following the Xerox implementation, only one zero is shown on the label of the arc 723 in FIG. 16.)

Figure 17:
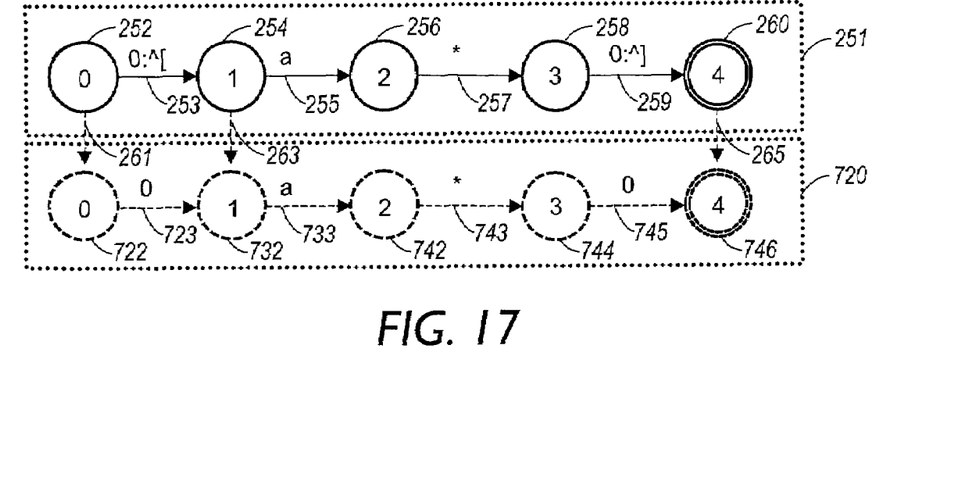

At this point, the current arc's destination, state 254, is made the current state. Having encountered an arc with a start delimiter label, the subsequent arcs on the delimited subpath (i.e., 0-0:^[-1-a-2-*-3 -0:^]-4) are copied to the new network 720 in a similar manner as described when in copy mode. Unlike copy mode, the states 256 and 258 that form part of the delimited regular expression in the FSN 251 are not associated with the corresponding states 742 and 744 in the new FSN 720, respectively, as shown in FIG. 17. However, a pointer 265 to the state 746 that terminates the arc 259 with the closing delimiter label is added to the data field of state 260. In addition as shown in FIG. 17, the closing delimiter label "^]" is replaced with the epsilon symbol on the arc 745 of the FSN 720, which corresponds to the arc 259 of the FSN 251.

Figure 10B:
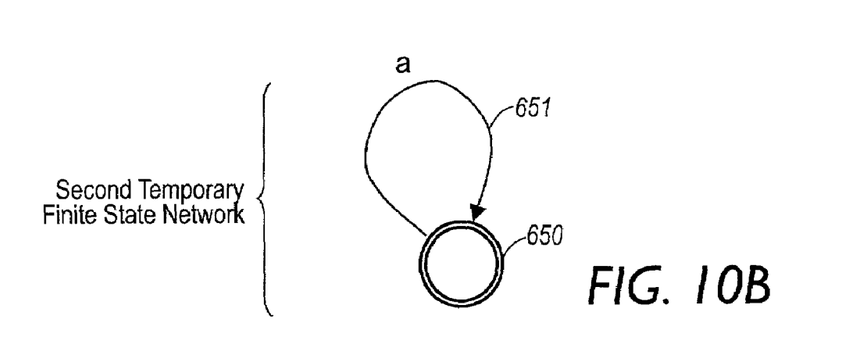
FIG. 10B illustrates an FSN produced at step 308 by compiling the string "a*" shown in FIG. 10A.
Figure 11:
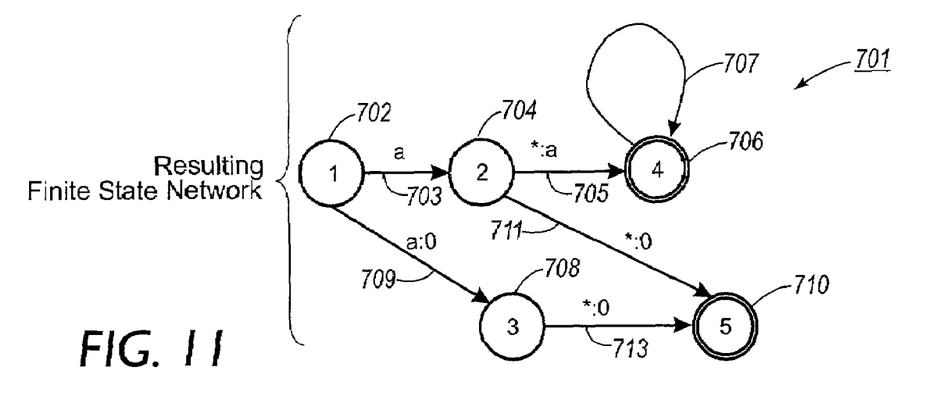
FIG. 11 illustrates the FSN that results from the cross-product of the FSN shown in FIG. 9B and the FSN shown in FIG. 10B.

The next step in the process is to replace the copied delimited subpath 1-a-2-*-3 (i.e., extracted subpath) in the FSN 720 with the FSN 701 shown in FIG. 11. The FSN 701 is produced by the compile-replace routine by performing the five steps 304, 306, 308, 310, and 312 described in detail above while referring to FIGS. 8–11. Briefly, at step 304, the labels on the indicated side of the extracted subpath, excluding the delimiter symbols, are concatenated to form the string "a*" which has the format of a regular expression. At step 308, the string is compiled into the FSN shown in FIG. 10B using the regular expression compiler. At step 306, the FSN shown in FIG. 9B is created by eliminating the symbols along the indicated side of the extracted subpath.

At step 310, the cross-product operation is performed to combine the finite-state networks shown in FIGS. 9B and 10B into the FSN 701 shown in FIG. 11 that maps the string encoded by the FSN shown in FIG. 9B to every string encoded by the FSN shown in FIG. 10B. At step 312, the resulting cross-product FSN 701 is spliced into the new FSN 720 under construction. The destination state 732 of the initial delimiter arc 723 is modified by replacing its arc set (i.e., arc 733) with the arcs 703 and 709 of the corresponding state 702 in the FSN 701 shown in FIG. 11. Epsilon arcs 747 and 749 leading to the destination state 746 of the final delimiter arc 745 are added to final states 706 and 710, respectively, of the FSN 701. The resulting FSN 720 output by the compile-replace routine is shown in FIG. 18.

D. Reduplication

The techniques described above can be applied to reduplication, as occurs for example in the Malay language. As mentioned above, full stem reduplication occurs with Malay stems such as "bagi", meaning "bag" or "suitcase". The plural of "bagi" is "bagibagi", formed by repeating the stem twice in a row. Such plurals cannot be generated directly by finite-state lexical techniques, but can be generated indirectly using the compile-replace routine.

Also as mentioned above, the regular expression X^n denotes the concatenation of n instances of X, so that X^2 denotes XX. Therefore, traditional finite-state lexicons, using concatenation, can model a relation containing pairs of strings such as <"bagi+Noun+Singular", "bagi"> and <"bagi+Noun+Plural", "^[{bagi}^2^]">. The intermediate FSN compiled from a lexicon with such relations contains subpaths in which labels on the upper side encode the first member of a pair (e.g., the baseform plus explanatory tags), and the labels on the lower side of the path encode a surface form of a word (e.g., bagi), or a substring (e.g., ^[{bagi}^2^]) from which a surface form can be obtained using the compiler-replace routine.

In this intermediate FSN, the plural for any noun stem is uniformly represented in the lower side language as a bracketed version of the stem (e.g., {bagi}) followed by "^2". When the delimited substring "{bagi}^2" is compiled as a regular expression by the compile-replace routine, the "^2" effectively causes the reduplication of the root, yielding the FSN for "bagibagi", which replaces the delimited subpath. The new relation then after being processed by the compile-replace routine is <"bagi+Noun+Plural", "bagibagi"> instead of the original <"bagi+Noun+Plural", "^[{bagi}^2^]">.

The compile-replace technique described above is thus applied to the lower side of the intermediate FSN to compile the delimited substring "{bagi}^2", yielding an FSN encoding of the language consisting of the string "bagibagi", which would then replace the delimited subpath. The resulting FSN would include pairs of strings such as <"bagi+Noun+Singular", "bagi"> and <"bagi+Noun+Plural", "bagibagi">. This output FSN can be used to map between lexical (i.e., citation) and surface forms. In this example, the regular expression itself is no longer present in the resulting FSN after the compile-replace operation. Each lexical form, including each plural, is paired with its surface form.

E. Interdigitation

The techniques described above can also be applied to interdigitation, as occurs for example in the Arabic language. As mentioned above, interdigitation occurs with Arabic roots such as "ktb", with a generalized meaning having to do with writing. A consonant root such as "ktb" can be combined with a vocalism such as "a", signifying perfect aspect and active voice, or "ui", signifying perfect aspect and passive voice, in accordance with a consonant-vowel template such as "CVCVC" to obtain stems such as "katab" and "kutib".

Such stems cannot be generated directly by finite-state lexical techniques such as concatenation, but can be generated indirectly by using the compile-replace routine. To generate interdigitated stems, it is useful to define a "template" as a language whose strings contain one or more symbols that denote a class, such as "C" for consonant and "V" for vowel. The members of each class are enumerated in a definition for the template.

It is also useful to define merge operators, ".m>." and ".<m.", each denoting a template filling operation between adjacent languages. One language is referred to as a "template", as defined above, and the other is referred to as a "filler". The objective of the merge operation is to align template strings with filler stings and to instantiate a class of symbols of the template as the matching filler symbols.

More specifically, the merge right operator ".m>." denotes the merge of the filler on its left into the template on its right. More precisely, the expression "X .m>. Y" denotes the merge of the filler X into the template Y by substituting, from left to right, each symbol x in the string or strings of X for the next uninstantiated symbol in every string of Y that x belongs to.

Similarly, the merge left operator ".<m." denotes the merge of the filler on its right into the template on its left. More precisely, "Y .<m. X" denotes the merge of the filler X into the template Y by substituting, from left to right, each symbol x in the string or strings of X for the next uninstantiated symbol in every string of Y that x belongs to.

Both merge operators yield a non-null result only in the case where the template contains enough class symbols, or "slots", to match a filler. The merge operators do not, however, require that all of a template be instantiated in one merge operation. If the filler language includes multiple strings, there may in principle be multiple ways of filling the template; in Arabic, however, the solutions are unique.

Applying the merge right operator to an example from Arabic, the template language can be [C V V C V C], where C is defined as the set of consonants {b, d, g, h, j, k, l, m, n, p, q, r, s, t, v, x, w, z}. The expression "k t b .m>. C V V C V C" denotes the language consisting of the string kVVtVb.

Similarly, applying the merge left operator, the template language can be [k V V t V b], where V is defined as the set of Arabic vowels {a, i, u}. The expression "k V V t V b .<m. u* i" denotes the language consisting of the string "kuutib". As the filler is merged with the template from left to right, the first two Vs are instantiated by u and the last one by i.

The left and right merge operators can thus be used together, as in the expression "ktb .m>. CVVCVC .<m. u* i", which also denotes the language consisting of the string "kuutib". This expression can be seen as the decomposition of kuutib into three components: a consonantal root [k t b], a consonant-vowel template [C V V C V C], and a vocalism [u* i].

The literature identifies various templates for Arabic verb forms, including TemplateI=[C V C V C], TemplateII=[C V C X V C], TemplateII=[C V V C V C], TemplateIV=['V C C V C], TemplateV=[t V C V C X V C], TemplateVI=[t V C V V C V C], TemplateVII=[n C V C V C], TemplateVIII=[C t V C V C], TemplateIX=[C C V C V X], TemplateX=[s t V C C V C], and others, where denotes the glottal stop and where X denotes the same value as the preceding element in the template. Similar verb forms templates have been identified for related languages.

As suggested above, Arabic vocalism patterns are typically associated with aspect and voice information. For example, the perfect aspect, active voice pattern, or PerfectActive, is [a+], and the perfect aspect, passive voice pattern, or PerfectPassive, is [u* i].

An Arabic stem formed as described above can also be combined with certain prefixes and suffixes by simple concatenation. Therefore, if [Prefix] denotes the language including all possible Arabic prefixes and if [Suffix] denotes the language including all possible Arabic suffixes, concatenation can be used to create lower-side strings of the form "Prefix ^[ktb .m>. TemplateI .<m. PerfectActive ^]Suffix".

The Arabic stem can therefore be characterized as the merge of three languages, a root language, a template language, and a vocalization language. Although the original string as a whole is built using concatenation, the part between the ^[and ^] delimiters is in the form of a regular expression that can be compiled and replaced using the compile-replace routine described above. With the above definitions, the compiled form is katab. Similarly, the compiled form of the string "^[ktb .m>. TemplateIII .<m. PerfectPassive ^]" is "kuutib" and the compiled form of "^[ktb .m>. TemplateVI .<m. PerfectPassive ^]" is "tukuutib".

It will be appreciated, however, by those skilled in the art that in place of the merge operators interdigitation could be more generally defined using conventional intersection operations of the regular expression calculus.

F. Applications

As mentioned above, the invention can be applied to produce FSNs or similar data structures for morphological analysis and generation, especially for languages having nonconcatenative processes of word formation. Morphological analysis, in turn, is a basic enabling technology for many text processing applications: Recognition of word forms is the first step towards part-of-speech tagging, parsing, translation, and other high-level linguistic applications. A web page illustrating a tool that responds to a surface form of an Arabic word, with or without vowels, by providing a root and an English gloss, is found at http://xrce.xerox.com/research/mltt/arabic/; the invention could be applied to provide an FSN for such a tool.

Constraints on word formation can be described as a language. Such a description can be compiled into an FSN and composed with transducers that describe morphological alternations to obtain an FSN that maps each inflected form of the language to all its morphological analyses, or base forms. Such an FSN is called by Xerox convention a lexical transducer. Constraint networks and networks describing morphological alternations can be applied before or after the compile-replace routine. A bidirectional lexical transducer can also be applied in the other direction to map from a base form to the word or words it represents.

The invention could also be applied in fields other than linguistics, however, and the implementation described above is generally applicable. The scope of the invention is therefore not limited to linguistics; instead, it may include any regular expressions over any alphabets.

G. Miscellaneous

For additional details of the present invention see "Finite-State Non-Concatentative Morphotactics" by Beesley and Karttunen published in the Proceedings of SIGPHON 2000, Workshop on Finite-State Phonology, pp. 1–12. Luxembourg, on Aug. 6, 2000, which is incorporated herein by reference.

It will be appreciated that portions of the system embodying the present invention may be readily implemented in software using software development environments that provide source code that can be used on a variety of hardware platforms. Alternatively, portions of the system may be implemented partially or fully in hardware using standard logic circuits. Whether software or hardware is used to implement different portions of the system varies depending on the speed and efficiency requirements of the system and also the particular function and the particular software or hardware systems and the particular microprocessor or microcomputer systems being utilized.

Also it will be appreciated by those skilled in the art that any resulting program(s) incorporating the present invention, having computer-readable program code, may be embodied within one or more computer-usable media such as memory devices or transmitting devices, thereby making a computer program product or article of manufacture. As such, the terms "article of manufacture" and "computer program product" as used herein are intended to encompass a computer program existent (permanently, temporarily, or transitorily) on any computer-usable medium such as on any memory device or in any transmitting device.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. A method for producing finite-state networks, comprising:
   producing an input finite-state network having a set of paths, with at least one of the paths in the set of paths containing a delimited subpath; the delimited subpath encoding on an indicated side a delimited substring formatted as a regular expression;
   creating a first temporary finite-state network by extracting from the first finite-state network the delimited subpath and eliminating symbols on the indicated side of the delimited subpath;
   creating a second temporary finite-state network by compiling the delimited substring formatted as a regular expression;
   computing the cross-product of the first temporary finite-state network and the second temporary finite-state network to create a resulting finite-state network that is a compiled representation of the delimited substring;
   producing an output finite-state network by replacing the delimited subpath in the input finite-state network with the resulting finite-state network; and
   performing language processing using the output finite-state network.

2. The method according to claim 1, wherein the delimited substring is produced by concatenating the symbols along the indicated side of the delimited subpath.

3. The method according to claim 1, wherein each finite-state network is represented using a data structure of a computer program.

4. The method according to claim 1, wherein the input finite-state network, the output finite-state network, and the third temporary finite-state network are finite-state transducers.

5. The method according to claim 1, wherein the first temporary finite-state network and the second temporary finite-state network are simple finite-state automata.

6. The method according to claim 1, wherein the input finite-state network and the second temporary finite-state network are formed using a regular expression compiler.

7. The method according to claim 1, wherein the output finite-state network encodes a relation that involves a non-concatenative process.

8. The method according to claim 7, wherein the nonconcatenative process is described by the regular expression in the delimited substring.

9. The method according to claim 8, wherein the nonconcatentative process described by the regular expression occurs in a natural language.

10. The method according to claim 7, wherein the non-concatenative process is interdigitation.

11. The method according to claim 1, wherein the delimited substring is given by:
   ^[X^n ^], which denotes a concatenation of n instances of X, where:
   ^[ is a special character string that serves as an opening delimiter;
   ^] is a special character string that serves as an closing delimiter;
   X is a language; and
   ^n denotes a concatenation of n instances of X.

12. The method according to claim 1, further comprising providing the output finite-state network to execute an application routine.

13. The system according to claim 12, wherein the application routine is a morphological analyzer.

14. The system according to claim 12, wherein the application routine is a morphological generator.

15. A system for producing finite-state networks, comprising:
   a regular expression compiler for producing an input finite-state network having a set of paths, with at least one of the paths in the set of paths containing a delimited subpath; the delimited subpath encoding on an indicated side a delimited substring formatted as a regular expression;
   a compile-replace module coupled to the regular expression compiler for:
   creating a first temporary finite-state network by extracting from the first finite-state network the delimited subpath and eliminating symbols on the indicated side of the delimited subpath;
   creating a second temporary finite-state network by compiling the delimited substring formatted as a regular expression with the regular expression compiler;
   computing the cross-product of the first temporary finite-state network and the second temporary finite-state network to create a resulting finite-state network that is a compiled representation of the delimited substring;
   producing an output finite-state network by replacing the delimited subpath in the input finite-state network with the resulting finite-state network; and
   a language processor that processes language using the output finite-state network.

16. The system according to claim 15, further comprising a runtime module that accesses the output finite-state network to execute an application routine.

17. The system according to claim 16, wherein the application routine performs morphological analysis.

18. The system according to claim 16, wherein the application routine performs morphological generation.

19. The system according to claim 15, wherein the delimited substring is given by:
   ^[X^n ^], which denotes a concatenation of n instances of X, where:
   ^[ is a special character string that serves as an opening delimiter;
   ^] is a special character string that serves as an closing delimiter;
   X is a language; and
   ^n denotes a concatenation of n instances of X.

20. The system according to claim 15, further comprising a regular expression compiler for forming the input finite-state network and the second temporary finite-state network.

* * * * *